Figure 3:
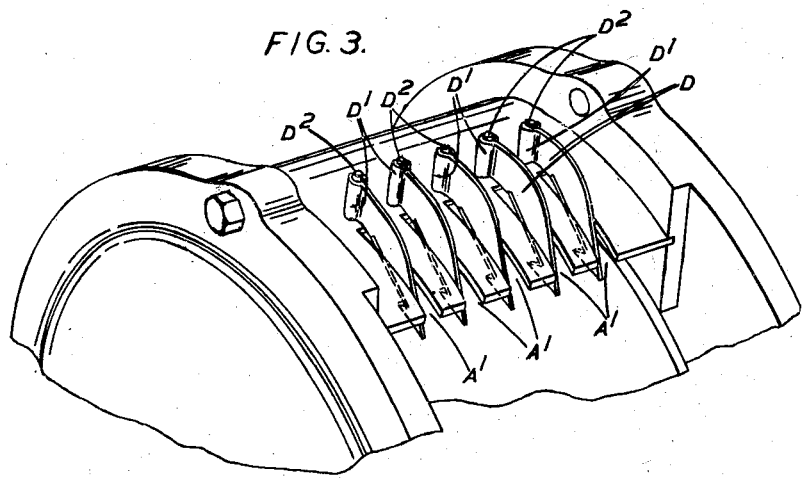

Oct. 18, 1949.   G. J. ABBOTT   2,485,344
MACHINE FOR SLICING POTATOES
Filed Aug. 1, 1947   3 Sheets-Sheet 1
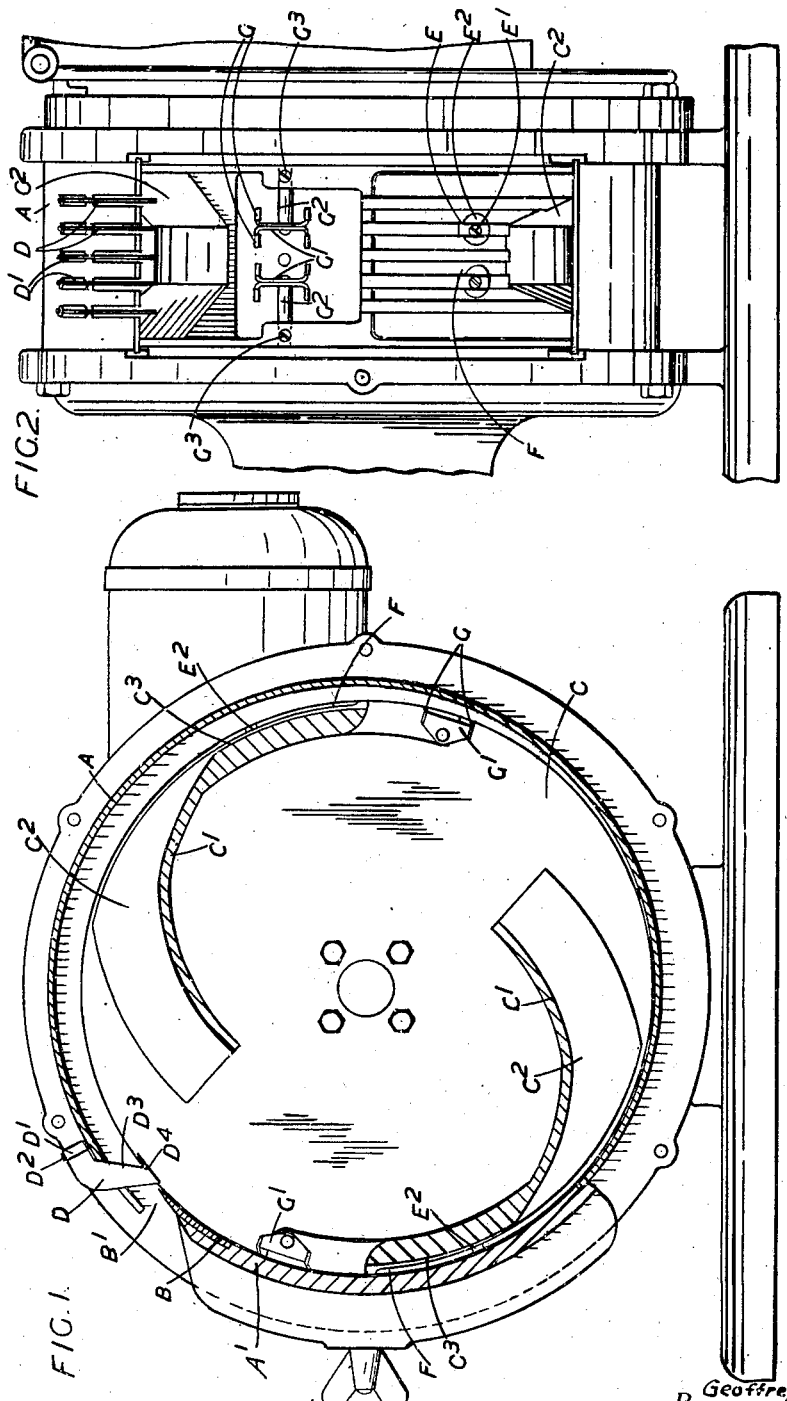
Inventor
Geoffrey J. Abbott
By Emery, Holcombe & Blair
Attorney Oct. 18, 1949.  G. J. ABBOTT  2,485,344
MACHINE FOR SLICING POTATOES Filed Aug. 1, 1947  3 Sheets-Sheet 2

Inventor
Geoffrey J. Abbott
By
Emery, Holcombe & Blair
Attorney

Oct. 18, 1949.　　　　G. J. ABBOTT　　　　2,485,344
MACHINE FOR SLICING POTATOES
Filed Aug. 1, 1947　　　　　　　　　　3 Sheets-Sheet 3
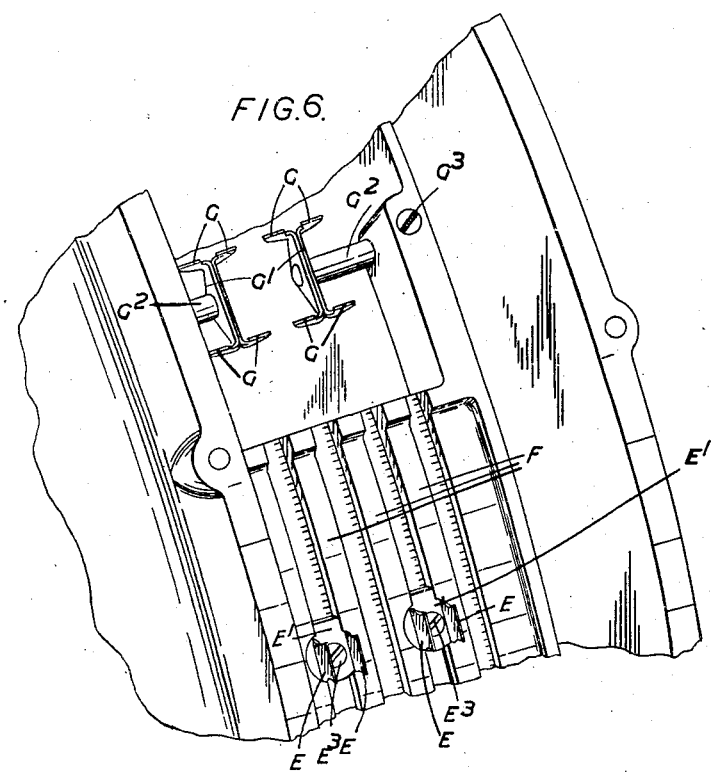
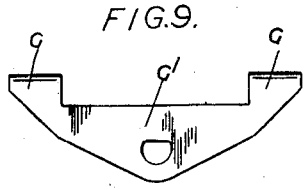
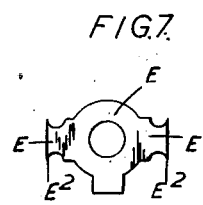
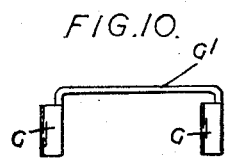
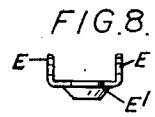
Inventor
Geoffrey J. Abbott
By
Emery, Holcombe & Blair
Attorney Patented Oct. 18, 1949

2,485,344

UNITED STATES PATENT OFFICE 2,485,344

MACHINE FOR SLICING POTATOES

Geoffrey Joseph Abbott, Carshalton, England

Application August 1, 1947, Serial No. 765,354
In Great Britain August 9, 1946

13 Claims. (Cl. 146—166)

This invention relates to machines for cutting potatoes or other like objects (hereinafter called potatoes) into chips or slices of the kind described in United States Patent No. 2,004,548, that is to say, comprising a rotary member and a stationary member, the rotary member having at least one channel-like passage or throat of converging cross-section into which the potato or other objects can be caused to enter and having one wall formed by the circumferential wall of the stationary member which carries or is formed with a slicing knife adjacent to, and usually constituting one edge of, a discharge slot so that when relative rotation between the members takes place, the slicing knife will cut from an object lying in the throat pieces which will pass from the machine through the discharge slot. When intended for cutting potatoes into "chips" such machines also have a series of slitting blades which slit the potato longitudinally but these may in some cases be omitted where only slicing without slitting is desired.

In the arrangement more particularly described in the specification of United States Patent No. 2,004,548 a pivoted rake is provided behind the narrow end of each throat for bringing the last piece of each potato or the like round to the discharge slot and since, as will be understood, the wall of the stationary member must be spaced from the wall of the rotary member by an appreciable distance immediately in advance of the discharge slot, since the slicing knife must lie at the inner edge of the discharge slot and yet be clear of the rotor, cam mechanism had to be provided for lifting the rake over the edge of the slicing knife. Such an arrangement involves additional moving parts inside the machine which cannot be lubricated in view of the contamination of the potatoes which would result, and thus presents difficulty in maintaining it both serviceable and clean.

The object of the present invention is to provide an improved machine of the kind in question having means for dealing with the last piece of each potato or the like which will overcome certain disadvantages inherent in the use of the pivoted rake.

To this end, in a machine of the kind referred to according to the present invention, means (hereinafter referred to as a piercing device) are provided in the space at the rear end of, or immediately behind the throat for attaching any piece of potato or the like which enters such space, to the rotor by penetrating or piercing the surface of the potato so that the last piece of each potato is attached to and carried round with the rotor by such piercing device. It is to be understood that the term "piercing device" includes a plurality of piercing members.

The invention is particularly applicable to machines in which in addition to the slicing knife, a series of slitting blades is provided which slit the potato longitudinally so that in conjunction with the slicing knife, they form it into chips. When the present invention is applied to such a machine, it may in some cases be possible to make the resistance to movement of the potato through the slitting blades so small that the piercing device can carry the last piece of potato through the slitting blades. For example, the slitting blades might be in the form of power-driven rotary knives.

In most cases, however, the slitting blades will not be power-driven and in this case, the resistance they offer will therefore probably be appreciable. According to a further feature of the present invention, therefore, the piercing device may be such that it will carry the piece of potato round into engagement with the slitting blades, but will then offer such small resistance to passage through the potato as compared with the resistance offered to the potato by the slitting blades, that the piercing device will then pass through the potato, leaving it impaled upon the slitting blades. One or more further claw members, hereinafter called a claw device are then fixed to the rotor in rear of the piercing device and adapted to engage and dig into the piece of potato and force it through the slitting blades.

In one convenient arrangement, the piercing device comprises a series of short blades or plates, projecting slightly from the surface of the rotor and lying in planes normal to the axis of rotation, each plate being formed so as to provide a forwardly directed spike adapted to pierce the potato, while the claw device comprises one or more plates having forwardly directed edges lying in planes parallel to the axis of the rotor. Thus the plates constituting the piercing device being edge-on to the potato may be readily forced through the potato when it meets the slitting blades whereas the plates constituting the claw device are capable of forcing the potato through the slitting blades.

In any case, the cutting edges of the slitting blades are preferably inclined so as to lie approximately tangential with respect to the rotor, with their outer edges in advance of their inner edges and in this case, the inner edges may carry or be formed with parts having small surfaces which tend to lift the last piece of potato radially outwards as it passes through the slitting blades, so as to lift it over the slicing knife. Such surfaces may be provided by forming each slitting blade with a forwardly directed point immediately beyond the inner end of the cutting edge, the upper surface of such point being left flat so as to form a small ramp or lifting surface.

Figure 4:
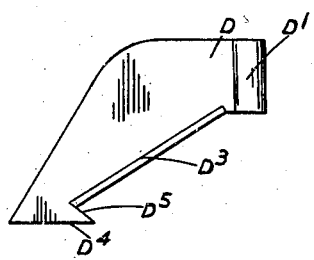
Figure 5:

The invention may be carried into practice in various ways but one construction of machine according to the invention including also the invention forming the subject of United States patent application No. 765,353 is illustrated by way of example in the accompanying drawings in which:

Figure 1 is a sectional end elevation,

Figure 2 is a side view with certain parts omitted and with a cover plate removed to show certain details of the interior of the machine, Figure 3 is an enlarged perspective view showing the form and arrangement of the slitting blades, Figures 4 and 5 are respectively a side view and a plan view of one of the slitting blades on an enlarged scale, Figure 6 is a perspective view on an enlarged scale showing a particular form employed in the machine illustrated for the parts constituting the more important features of the present invention, Figures 7 and 8 illustrate the construction of one of the parts shown specially in Figure 6, and Figures 9 and 10 show the construction of another of the parts shown specially in Figure 6.

In the construction illustrated the machine comprises a generally cylindrical casing having a circumferential wall A, the inner surface of which is of involute form as indicated. The inner end portion of the involute circumferential wall of the casing is formed as a detachable cover plate indicated at $A^1$ in Figure 1, carrying a slicing knife B which constitutes the inner end of the involute wall and the inner edge of a discharge slot $B^1$ through which the slices of potato are ejected.

Arranged within the casing is a rotor C formed as a disc having formed or carried thereon two members $C^1$ which with the circumferential wall A, form throats $C^2$ each extending in a circumferential direction and having a diminishing cross-section from its outer or open end towards its inner end.

Each of these throats terminates at its narrow end in a part $C^3$ which if the wall A were cylindrical, would be of substantially constant cross-section, these parts being hereinafter called the tails of the throats, into which therefore will normally travel the last piece of any potato after the remainder has been sliced therefrom by the slicing knife B due to rotation of the rotor.

The general arrangement and functioning of the machine will not be further described since this is known and will be clear from U. S. Patent No. 2,004,548.

In the particular example of the machine according to the present invention shown in the drawings, a series of slitting blades D are provided immediately in front of the slicing knife B, each slitting blade being of the form shown and having its outer end formed as a socket $D^1$ and pivoted on a radial pivot pin $D^2$ while its inner end extends through a slot $A^1$ in the circumferential wall A to a point where it will lie in the path of a potato in either of the throats $C^2$.

The cutting edge $D^3$ of each slitting blade is inclined to the radial direction as shown and terminates at its inner end at a forward projection $D^4$ having an inclined unsharpened upper surface $D^5$.

The width of the slots $A^1$ is sufficient to permit free pivotal movement of the blades D within the required limits while limiting their pivotal movement when they are free. It will be seen that as each potato is picked up by one of the throats $C^1$ $C^2$ and carried round and through the blades D it will be slit by these blades and the slit part sliced off by the slicing knife B to form a series of chips which are ejected through the slot $B^1$.

The means according to the present invention for dealing with the last piece or pieces of potato left in either of the throats $C^3$ are shown more particularly in Figures 6 to 10 but appear also in Figures 1 and 2.

These means comprise parts positioned in the tail of each throat and behind the rear end of such tail. Thus there are positioned in the tail of each throat a series of piercing members E each formed by the upturned end of a plate $E^1$ initially shaped in the manner shown in Figure 7 and finally formed into the shape indicated in Figures 6 and 8 so that each piercing member constitutes a plate lying parallel to its direction of travel, that is to say edge on to the potato which it is to engage, and having a forwardly facing point $E^2$ which will pierce the potato on impact and thus attach the potato to the rotor.

As shown the piercing members are secured to the rotor by screws $E^3$ and have associated with them a ridge member comprising a series of ridges F with gaps or channels between them for the passage of the slitting blades D. The ridges are of such a height that they just clear the slicing knife B. In this way the effective diameter of the tail of the throat is made as large as the position of the slicing knife B permits while yet providing clearance channels for the slitting blades D.

It will be appreciated that the resistance to travel of the piercing members E through any piece of potato impaled upon them will not be great in view of their form, with the result that when any such piece of potato when it meets the slitting blades D becomes impaled upon the slitting blades and the piercing members E pass through the potato. In order then to force the piece of potato, now impaled upon the slitting blades, through such blades and over the slicing knife B, there are arranged on the rotor in rear of the tail of each throat claw members. These claw members are constituted by the outwardly projecting and forwardly directed ends G of plates $G^1$ which are initially of the form shown in Figure 9 and are bent into the form indicated in Figures 6 and 10, such plates being arranged in pairs as shown in Figure 6 and each pair being mounted upon a supporting pin $G^2$ secured in a hole in the rotor by a clamping screw $G^3$. This arrangement therefore provides eight claw members which, since they lie in planes at right angles to their direction of movement, offer high resistance to travel through any piece of potato into engagement with which they are brought.

In operation the slitting blades only enter a short distance into a piece of potato impaled upon them as above described so that the rear end of the piece of potato is unsupported. When the tail of the throat has passed the piece of potato, therefore, the rear end of the piece of potato tends to fall and its under surface comes into engagement with the ends G of the claw members which thus dig into it and force it through the slitting blades and over the slicing knife. The inclined unsharpened upper surfaces $D^5$ of the slitting blades tend to lift such pieces of potato upwards so that they pass clear of the slicing knife B and out of the slot $B^1$, thus tending to avoid thin slices being taken from the final piece of potato and passing inside the slicing knife, and hence the accumulation of potato refuse within the casing.

What I claim as my invention and desire to secure by Letters Patent is:

1. A slicing machine comprising a stationary member carrying at least one knife adjacent to a discharge slot and a rotor within the stationary member including at least one channel-like passage or throat of converging cross-section having one wall formed by the circumferential wall of the stationary member and at least one piercing device situated in a space to the rear of the throat and adapted to pierce and hold any piece of potato which comes into engagement therewith, so that it is carried around with the rotor into engagement with a knife, said knife presenting a greater resistance to the passage of the potato than said piercing device, whereupon the piece of potato is left impaled upon the knife and the piercing member cuts through the piece of potato.

2. A slicing machine as claimed in claim 1 including at least one pusher member fixed on the rotor to the rear of the piercing device and formed to force past the knife any piece of potato impaled thereon.

3. A slicing machine as claimed in claim 2 in which circumferentially extending ridges are provided on the rotor in the space immediately behind the throat in which space the piercing device lies, the radial height of these ridges being such that they pass close to the slicing knife while the depth of the grooves between them is such as to permit the passage of the slitting blades.

4. A slicing machine comprising a stationary member carrying a slicing knife adjacent to a discharge slot and a series of slitting blades in advance of the slicing knife, a rotor within the stationary member including at least one channel-like passage or throat of converging cross-section having one wall formed by the circumferential wall of the stationary member, at least one piercing device situated in a space at the rear end of or immediately behind the throat to penetrate the surface of any piece of potato which comes into engagement therewith and attach it to the rotor and thereby carry it into engagement with the slitting blades, the resistance to travel through a piece of potato of the piercing device being less than the resistance to travel of the potato through the slitting blades, and at least one claw device on the rotor in rear of the piercing device for engaging any piece of potato impaled upon the slitting blades and forcing it through such blades.

5. A slicing machine as claimed in claim 4 in which the slitting blades have cutting edges which are angularly disposed with respect to the periphery of the rotor and terminate adjacent thereto in forwardly projecting parts having inclined surfaces substantially tangential to said rotor periphery and adapted to lift any portion of potato forced through said slitting blades by the claw device sufficiently to clear the slicing knife disposed behind the slitting blades.

6. A slicing machine as claimed in claim 5 in which each slitting blade is pivoted on an axis lying adjacent to its front end and has a cutting edge which lies in the same plane as but is inclined to the pivotal axis.

7. A slicing machine as claimed in claim 1 in which each piercing device is in the form of a plate lying substantially parallel to its direction of movement and having its forward edge curved or inclined to form a piercing member.

8. A slicing machine as claimed in claim 4 in which each piercing device is in the form of a plate lying substantially parallel to its direction of movement and having its forward edge curved or inclined to form a piercing member.

9. A slicing machine as claimed in claim 4 in which each slitting blade is independently pivoted so that it can take up automatically a position in which the lateral forces thereon are approximately balanced.

10. A slicing machine as claimed in claim 9 in which protuberances are provided on the stationary member adjacent the slitting blades which limit the free pivotal movement of said blades to substantially that required for their automatic adjustment during each slitting operation.

11. A slicing machine comprising a stationary casing having an involute circumferential wall carrying a slicing knife constituting the inner end of the involute wall and forming with the outer end of such wall a discharge slot, a rotor within the casing including at least one throat of converging cross-section having one wall formed by the circumferential wall of the casing, the throat having a tail portion of approximately parallel narrow cross-section, a plurality of piercing members mounted on the rotor in the tail and each including a plate lying in a plane normal to the axis of rotation with a forward edge formed to provide a piercing member, circumferentially extending ridges in the tail having a radial height such as just to clear the slicing knife while the grooves between them have a depth sufficient to permit passage of the slitting blades, and claw members carried by the rotor in rear of the tail to engage and force through the slitting blades any piece of potato which may be moved thereon by the piercing device.

12. A slicing machine as claimed in claim 11 in which a plurality of slitting blades lying in planes approximately normal to the axis of rotation of the rotor are pivoted to the circumferential wall of the casing on radial axes lying adjacent to their forward ends.

13. A slicing machine as claimed in claim 12 in which each claw member is constituted by the forwardly bent end of a plate lying in a plane containing or by lying parallel and close to the axis of rotation.

GEOFFREY JOSEPH ABBOTT.

REFERENCES CITED

The following references are of record in the file of this patent:

UNITED STATES PATENTS

| Number | Name | Date |
|---|---|---|
| 466,453 | Burns | Jan. 5, 1892 |
| 1,775,813 | Colby | Sept. 16, 1930 |
| 1,974,194 | Phillips | Sept. 18, 1934 |
| 2,004,548 | Abbott | June 11, 1935 |